(12) United States Patent
Minikey, Jr. et al.

(10) Patent No.: US 10,129,445 B2
(45) Date of Patent: Nov. 13, 2018

(54) ROOF MOUNTED IMAGER MODULE

(71) Applicant: Gentex Corporation, Zeeland, MI (US)

(72) Inventors: Danny L. Minikey, Jr., Fenwick, MI (US); Michael G. Hendricks, Wyoming, MI (US); Kevin A. Schueler, Grand Haven, MI (US); Peter T. Kantola, Ravenna, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/449,005

(22) Filed: Mar. 3, 2017

(65) Prior Publication Data

US 2017/0257535 A1    Sep. 7, 2017

Related U.S. Application Data

(60) Provisional application No. 62/303,876, filed on Mar. 4, 2016.

(51) Int. Cl.
*H04N 5/225* (2006.01)
*B60R 11/00* (2006.01)
*B60R 11/04* (2006.01)

(52) U.S. Cl.
CPC ........... *H04N 5/2253* (2013.01); *B60R 11/04* (2013.01); *H04N 5/2252* (2013.01); *B60R 2011/004* (2013.01)

(58) Field of Classification Search
CPC . B60R 11/04; B60R 2011/004; H04N 5/2252; H04N 5/2253
See application file for complete search history.

(56) References Cited

U.S. PATENT DOCUMENTS

| 4,063,258 | A  | 12/1977 | Allen |
| 4,621,785 | A  | 11/1986 | Embra |
| 5,619,036 | A  | 4/1997  | Salvio et al. |
| 5,760,828 | A  | 6/1998  | Cortes |
| 5,833,101 | A  | 11/1998 | Watkins |
| 6,333,759 | B1 | 12/2001 | Mazzilli |

(Continued)

FOREIGN PATENT DOCUMENTS

| EP | 1006486 A2 | 6/2000 |
| EP | 1006486 A3 | 8/2000 |

(Continued)

OTHER PUBLICATIONS

Federal Institute of Industrial Property, "International Search Report and the Written Opinion," dated Jun. 29, 2017 (8 pages).

*Primary Examiner* — Anner N Holder
(74) *Attorney, Agent, or Firm* — Price Heneveld LLP; Bradley D. Johnson

(57) ABSTRACT

A roof mounted module for a vehicle includes a base plate configured to be operably coupled with a vehicle roof. An outer housing operably coupled with the base plate. An inner housing proximate the outer housing, including an imager sealing portion defining a sealing plane. The inner housing defines an inner cavity. An imager module is disposed in the cavity and is in communication with a viewing aperture defined through the outer housing. An imager mounting feature is disposed between the imager module and the inner housing. The imager mounting feature applies a force acting in a direction normal to the sealing plane.

20 Claims, 4 Drawing Sheets

(56) References Cited

U.S. PATENT DOCUMENTS

| | | | |
|---|---|---|---|
| 6,536,961 B1 | 3/2003 | Gillies | |
| 6,580,373 B1 | 6/2003 | Ohashi | |
| 7,111,996 B2 | 9/2006 | Seger et al. | |
| 7,245,207 B1 | 7/2007 | Dayan et al. | |
| 7,265,656 B2 | 9/2007 | McMahon et al. | |
| 7,448,812 B2 | 11/2008 | Heibel | |
| 7,499,100 B2 | 3/2009 | Miyazaki et al. | |
| 7,609,961 B2 | 10/2009 | Park | |
| 7,881,496 B2 | 2/2011 | Camilleri et al. | |
| 7,883,064 B2 | 2/2011 | Luft et al. | |
| 2006/0238318 A1 | 10/2006 | Brouwer | |
| 2007/0182817 A1 | 8/2007 | Briggance | |
| 2007/0236569 A1 | 10/2007 | Lin | |
| 2009/0122141 A1 | 5/2009 | Nakamura et al. | |
| 2010/0110192 A1* | 5/2010 | Johnston | H04N 5/2251 348/148 |
| 2010/0118145 A1 | 5/2010 | Betham et al. | |
| 2010/0277379 A1 | 11/2010 | Lindackers et al. | |
| 2011/0317298 A1 | 12/2011 | van Stiphout | |
| 2012/0327234 A1 | 12/2012 | Fish, Jr. et al. | |
| 2014/0111684 A1 | 4/2014 | Corbin et al. | |
| 2015/0307026 A1 | 10/2015 | Minikey, Jr. et al. | |

FOREIGN PATENT DOCUMENTS

| | | |
|---|---|---|
| EP | 1227683 B1 | 7/2006 |
| KR | 100909368 B1 | 7/2009 |
| KR | 101134305 B1 | 4/2012 |
| KR | 101155607 B1 | 6/2012 |
| KR | 101343814 B1 | 12/2013 |

\* cited by examiner

ROOF MOUNTED IMAGER MODULE

CROSS-REFERENCE TO RELATED APPLICATION

This application claims priority to and the benefit under 37 U.S.C. § 119(e) of U.S. Provisional Application No. 62/303,876, filed on Mar. 4, 2016, entitled "ROOF MOUNTED IMAGER MODULE," the disclosure of which is hereby incorporated herein by reference in its entirety.

BACKGROUND OF THE DISCLOSURE

The present disclosure generally relates to an imager module, and more particularly relates to a roof mounted imager module for a vehicle.

SUMMARY OF THE DISCLOSURE

One aspect of the disclosure includes a roof mounted module for a vehicle having a base plate configured to be operably coupled with a vehicle roof. An outer housing operably coupled with the base plate. An inner housing proximate the outer housing, including an imager sealing portion defining a sealing plane. The inner housing defines an inner cavity. An imager module is disposed in the cavity and is in communication with a viewing aperture defined through the outer housing. An imager mounting feature is disposed between the imager module and the inner housing. The imager mounting feature applies a force acting in a direction normal to the sealing plane.

Another aspect of the disclosure includes a roof mounted module for a vehicle having a base plate including an imager sealing portion. An outer housing is operably coupled with the base plate. An inner housing is proximate the outer housing and includes an imager sealing portion defining a sealing plane. The inner housing includes an interior wall that defines a forward electronics compartment and a rearward imager module compartment. An imager module is disposed in the cavity and is in communication with a viewing aperture defined through the outer housing. An imager mounting feature is disposed between the imager module and the inner housing. The imager mounting feature applies a force parallel to the sealing plane.

Still another aspect of the disclosure includes a roof mounted module having a base plate configured to be operably coupled with a vehicle roof. A housing assembly is operably coupled with the base plate. An imager sealing portion defines a sealing plane. An imager module is disposed in the housing assembly and is in communication with a viewing aperture defined through the housing assembly. An imager mounting feature is disposed between the imager module and the housing assembly. The imager mounting feature applies a force acting in a direction normal to the sealing plane.

These and other features, advantages, and objects of the present disclosure will be further understood and appreciated by those skilled in the art by reference to the following specification, claims, and appended drawings.

DETAILED DESCRIPTION OF EMBODIMENTS

Figure 1:
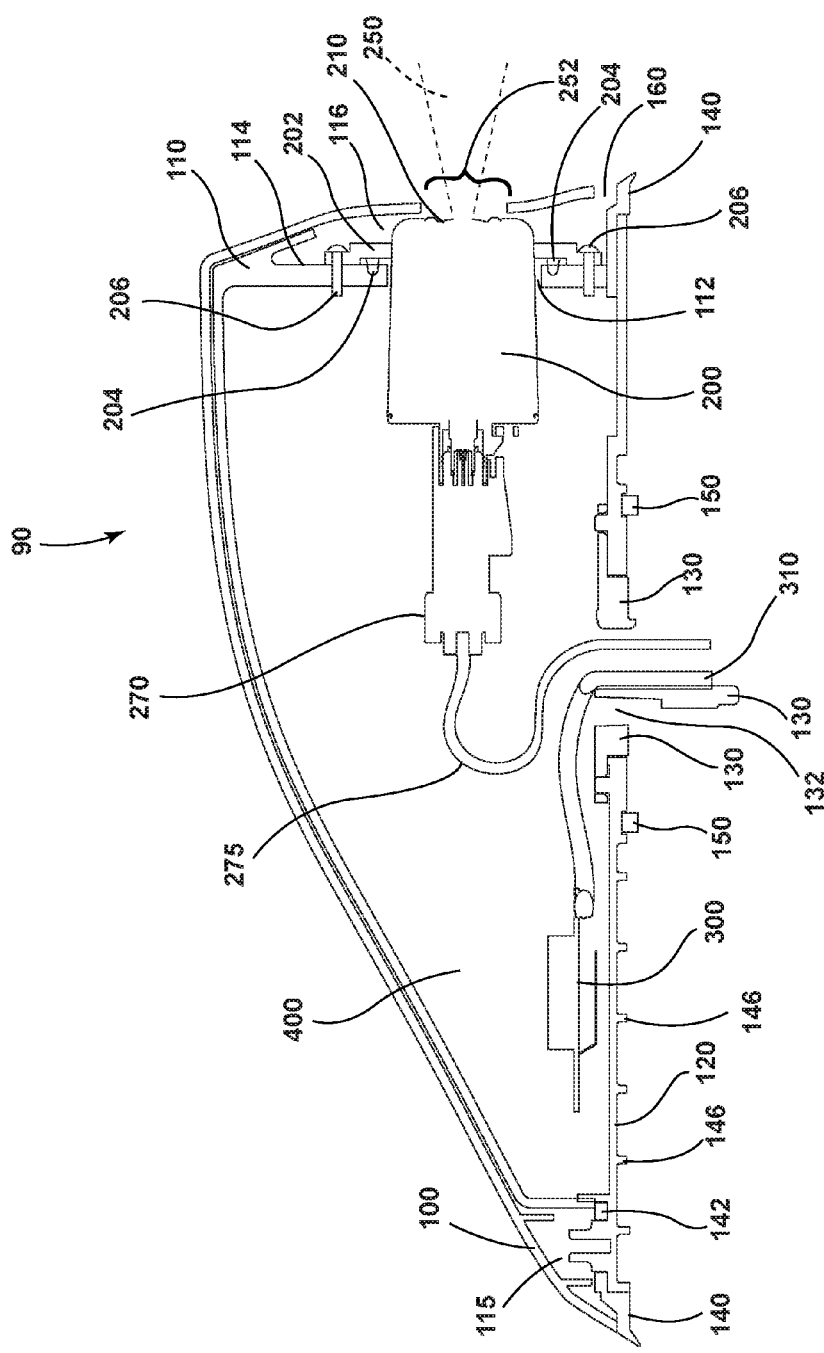
FIG. 1 is a front elevational view of one embodiment of an imager module of the present disclosure.

The present illustrated embodiments reside primarily in combinations of method steps and apparatus components related to a roof mounted imager module. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-4, reference numeral 90 generally designates a roof mounted module for a vehicle including a base plate 120 configured to be operably coupled with a vehicle roof. An outer housing 100 is operably coupled with the base plate 120. An inner housing 110 is proximate the outer housing 100 and includes an imager sealing portion 114, which may define a sealing plane. The inner housing 110 defines an inner cavity 400. An imager module 200 is disposed in the cavity 400 and is in communication with a viewing aperture 252 defined through the outer housing 100. An imager mounting feature 202, which may include flanges, is disposed between the imager module 200 and the inner housing 110. The imager mounting feature 202 applies a force on the inner housing 110 acting in a direction normal to the sealing plane. A plug 270 supplies power and/or data to the imager module 200. In addition, the plug 270 may receive image data from the imager module 200, which can be relayed to the vehicle or a display module within the vehicle.

The outer housing 100 includes the imaging viewing aperture 252 and retention features to the inner housing 110. One purpose of the outer housing 100 is to provide a clamp force between a body seal 140 and the roof of the vehicle. Another purpose of the outer housing 100 is to provide an aesthetic cover over the inner housing 110 of the exterior module. Through the use of an aesthetic cover, it is possible to hide the fasteners, seals, and other components that are not typically seen from the outside of the vehicle. The outer housing 100 protects the inner components of the roof mounted module 90 from the elements and may also color match an exterior color of the vehicle.

The inner housing 110 includes an imager receiving area 112, the imager sealing portion 114 defining an imager sealing plane, and retention features to a base plate 120. The inner housing 110 is disposed on the exterior of the vehicle and provides a cavity or sealed area 400 to protect the imager module 200 and exterior module electronics 300 from water and dust intrusion. The inner housing 110 includes the imager receiving area 112 that provides an aperture through which the imager module 200 can collect image data. The imager sealing portion 114 provides a surface for the imager mounting feature 202 to apply compression force to an imager seal 204. The inner housing 110 also includes a receiving area for fasteners 206. Although a substantial portion of the inner housing 110 and the outer housing 100 are shown in very close or abutting contact in the figures, it will be understood that various other configurations may also be utilized as disclosed herein. In addition, it will be understood that a forward space 115 is provided between the inner housing 110 and the outer housing 100, and a rearward space 116 is provided between the inner housing 110 and the outer housing 100. The size and structure of these spaces, as defined between the inner housing 110 and the outer housing 100 may vary depending on the application.

A base plate 120 is coupled to an attachment feature 130. The base plate 120 is generally surrounded by a body seal 140 that limits intrusion of water, dirt, and debris between the base plate 120 and the roof of the vehicle. In addition, the base plate 120 includes a variety of downwardly extending support flanges 146 configured to provide structural rigidity to the base plate 120, while maintaining a minimal weight of the base plate 120. The attachment feature 130 is used for assembly to the body panel. When the attachment is made to the body panel, the base plate 120 compresses an inner seal 150 to protect the interior of the vehicle from water and dust intrusion. The attachment feature 130 defines an opening 132 that allows an imager wire 275 and an electronic module wire 310 to pass through from the exterior to the interior of the vehicle. It is also generally contemplated that a variety of other wires may also pass through the opening 132 to provide data and/or power to other modules disposed inside the inner housing 110, including an antenna, global positioning system (GPS) module, etc. In addition, the attachment feature 130 may include locating features that manage the various wires, such that the wires can be more easily coupled with complementary wires extending through the roof of a vehicle.

The base plate 120 includes the attachment feature 130. The base plate 120 is coupled with the inner seal 150. The inner seal 150 may include foam, rubber, etc., and may be in the form of an O-ring or template constructed to fit around the opening 132. The body seal 140 may be in the form of an O-ring or template constructed to fit around the opening 132. The exterior module electronics 300 may be attached to the base plate 120 by adhesive, mechanical fasteners, interference fit, etc. The body seal 140 is placed on the base plate 120. The body seal 140 is larger than the inner seal 150 and may be formed from foam, rubber, etc. The body seal 140 includes a peripheral portion, which makes contact to and seals to the body of the vehicle when the attachment feature 130 is tightened. An interference seal 142 connects and seals the inner housing 110 with the base plate 120. The inner housing 110 is attached to the base plate 120 by screws, snaps, rivets, etc.

The imager module 200 includes the imager mounting feature 202, a lens surface 210, a viewing cone 250, and all of the other components previously disclosed for rear vision cameras. A clear polymeric or glass cover lens may extend over the viewing window generally flush with a rear wall of the imager module. The exterior module electronics 300 can include GPS, radio, and all of the other components previously disclosed for rear vision cameras.

The imager module 200 is attached via the imager mounting feature 202 to the inner housing 110, creating a water/dust tight seal at the imager seal 204. The imager mounting feature 202 may be integrated into the imager housing, or may be a separate mounting bracket that is attached to the imager housing. The imager module 200 is attached to the inner housing 110 using the fasteners 206, which are installed normal, or perpendicular, to the imager sealing portion 114. The fasteners 206 may be screws, rivets, push pins, linear snaps, etc. With this construction, the imager module 200 only needs to be sealed in the area between the imager sealing portion 114 and the outer housing 100, which allows for the imager module 200 to be constructed with a non-sealed connector.

The outer housing 100 may be attached to the inner housing 110 through the use of snap features, mechanical fasteners, etc. When the outer housing 100 is in the installed position, the imager viewing aperture 252 is not obstructing the viewing cone 250 of the imager module 200. There is also a drainage opening 160 to allow any water that gets between the outer housing 100 and the inner housing 110 to drain out of the imager module 200.

Figure 2:
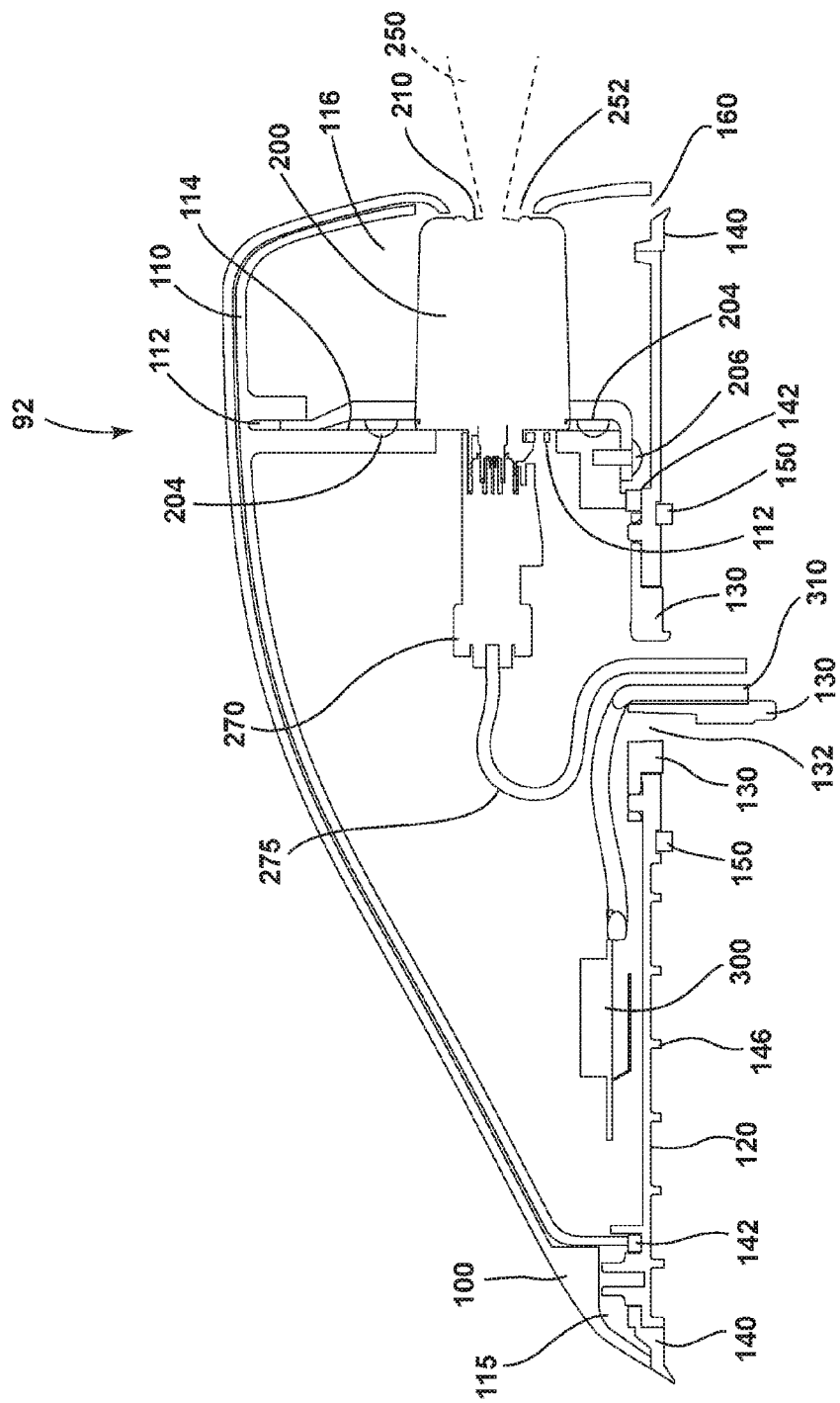
FIG. 2 is a front elevational view of another embodiment of an imager module of the present disclosure.

With reference now to FIG. 2, another embodiment of the present disclosure is set forth, which illustrates a roof mounted module 92 having the rearward space 116 that is generally defined between the inner housing 110 and the outer housing 100 having a larger volume than the embodiment of FIG. 1. In this instance, the inner housing 110 extends along an inside surface of the outer housing 100 and terminates proximate a top of the imager module 200. This construction results in a smaller package space for electronics and components of the imager module 200, but increases the overall package space within which the imager module 200 is positioned. Accordingly, this embodiment may be useful where the imager module 200 is replaced, or different imager modules may be used for different styles or makes of vehicles. In this instance, the imager module 200 can be replaced readily without removing both the inner housing 110 and the outer housing 100. In FIG. 2, removal of the outer housing 100 may be all that is needed to repair or replace the imager module 200.

Figure 3:
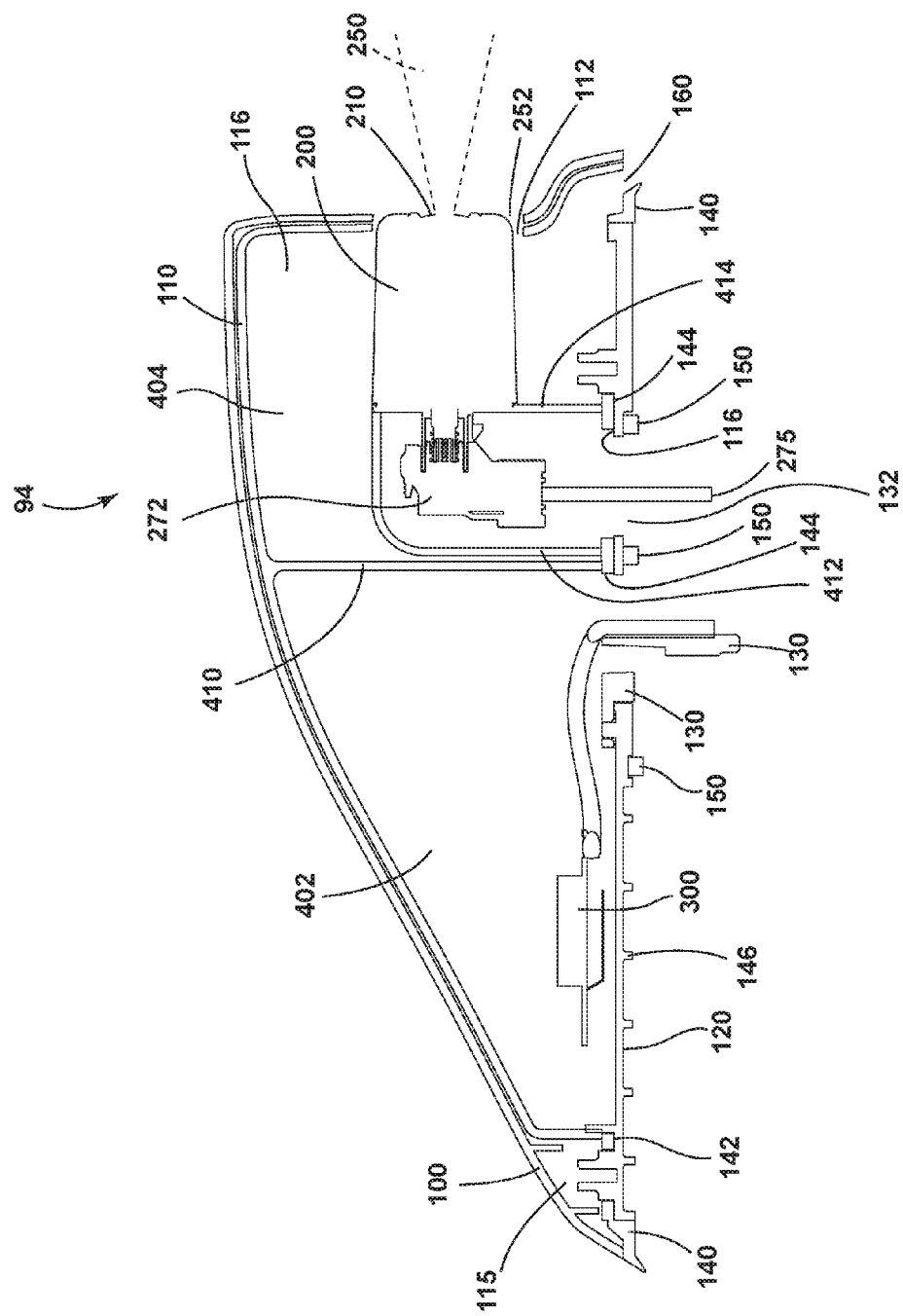
FIG. 3 is a front elevational view of another embodiment of an imager module of the present disclosure.

With reference now to FIG. 3, a roof mounted module 94 includes the imager module 200 disposed in an imager compartment 404 sealed from the exterior module electronics 300 positioned in an electronics compartment 402. The electronics compartment 402 and the imager compartment 404 are separated by an interior wall 410 that extends downwardly from an inside surface of the inner housing 110. The imager compartment 404 is simply the rearward space 116 enlarged, which allows for a larger imager or additional components to be added within the rearward space 116. In addition, the rear walls of the inner housing 110 and the outer housing 100 are largely complementary, such that there is no space between the inner housing 110 and the outer housing 100 proximate the viewing window, or the space defined between the inner housing 110 and the outer housing 100 proximate the viewing area is only minimal. Further, seals 144 are positioned inside the roof mounted module 94 and abut the base plate 120, the interior wall 410, and the downwardly extending walls 412, 414 of the imager module 200. Notably, in this instance, the imager 200 is operably coupled with a vertically-oriented plug 272.

Figure 4:
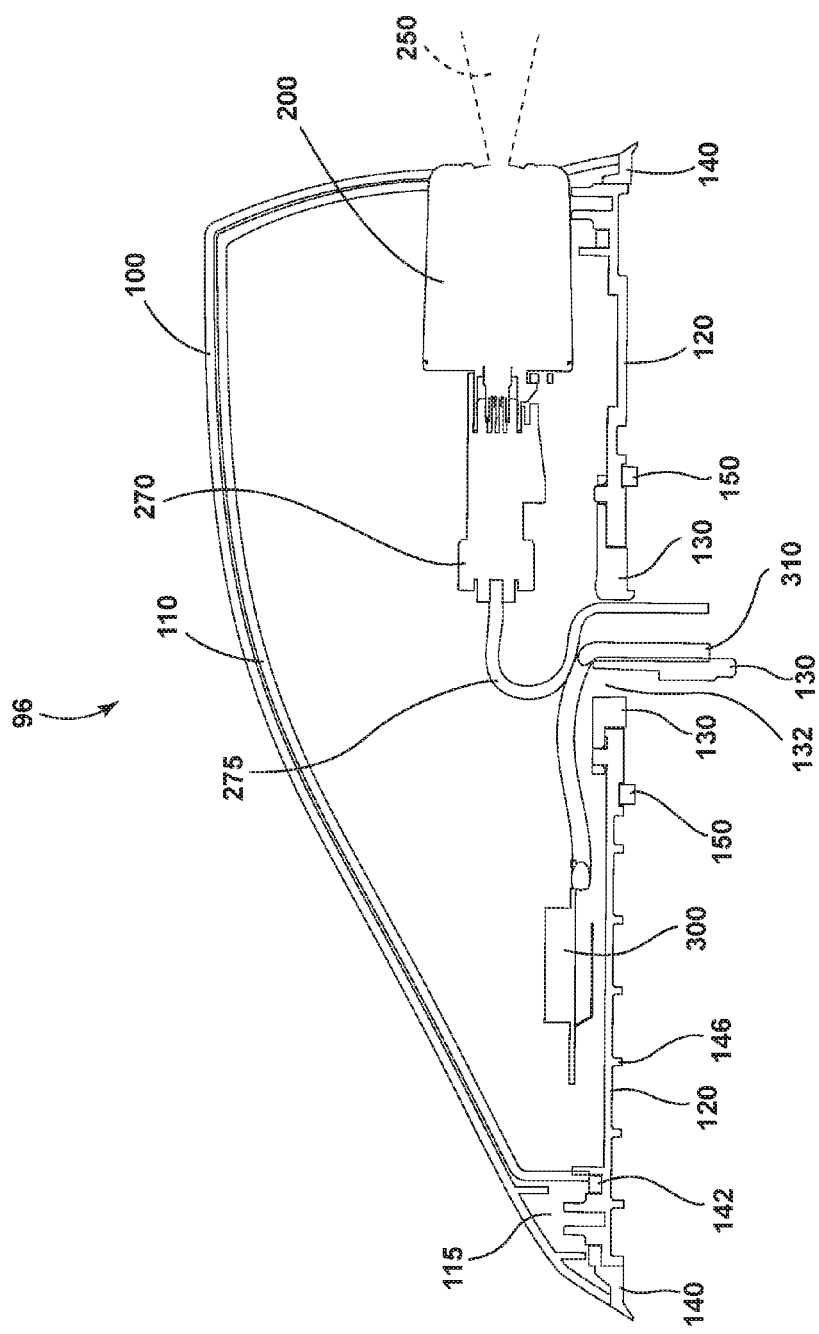
FIG. 4 is a front elevational view of another embodiment of an imager module of the present disclosure.

With reference now to FIG. 4, a roof mounted module 96 includes a single interior cavity that supports both the exterior module electronics 300, as well as the imager module 200. In this instance, the top portion of the imager module 200 is in abutting contact or close proximity to the outer housing 100. Accordingly, the rearward space 116 has been eliminated, resulting in a minimal space or no space between the inner housing 110 and the outer housing 100 proximate the viewing window. Access to the exterior module electronics 300 also allows for access to the components of the imager module 200.

The roof mounted antenna and imager module concepts, as set forth herein, are generally configured to provide a versatile system that allows for different antenna components and housings to be paired with different imager components and housings. This configuration enables an automotive manufacturer the ability to offer different imager and/or antenna options or packages utilizing the same basic housings. Accordingly, uniformity across various product offerings can be maintained. For example, the automotive manufacturer can pair "premium," "standard," and "base" model vehicles with corresponding "premium," "standard," and "base" roof mounted modules, such as those described above. Further, in an automotive manufacturing facility that produces multiple vehicles, the facility can receive a single imager housing that includes hardware and software to support any of a variety of imager/antenna combinations and inner/outer housing combinations such that any number of interchangeable roof mounted modules can be provided to the consumer. The modules shown and described herein offer advantages to receiving and inventory departments of Original Equipment Manufacturers (OEM) with substantial versatility and flexibility.

The various configurations set forth herein provide different modularity and connectability based on OEM preferences and user preferences. For example, the roof mounted module 90 of FIG. 1 can be utilized where imagers 200 of different sizes (depths) may be necessary. The imager 200 of FIG. 1 could be removed and a larger imager could be installed as there is ample space within the inner cavity 400. Conversely, the construction of FIG. 2 provides the rearward space 116 within which the imager module 200 is positioned. However, the space within which the exterior modular electronics 300 is positioned is large enough to accommodate electronics of different shapes and sizes, as well as additional electronic modules, if desired. The construction of FIG. 3 is a hybrid of FIGS. 1 and 2, and the construction of FIG. 4 is configured to maximize the space within the inner housing 110 for different imager modules, electronics, etc., and to provide additional space for the components, as desired.

The imager module is a high dynamic range imager, wherein examples of such a system are described in U.S. Pat. Nos. 8,289,430; 8,629,927; 8,305,471; 8,587,706; 8,378,284; and 8,144,223, the entire disclosures of which are hereby incorporated herein by reference. The imager module may be operably coupled to a lateral circuit board adjacent the base plate.

The present disclosure may be used with an imager module such as that described in U.S. Pat. Nos. 9,174,577; 8,925,891; 8,814,373; 8,201,800; and 8,210,695; U.S. Patent Application Publication No. 2012/0327234, now U.S. Pat. No. 9,838,653; and U.S. Provisional Patent Application Nos. 61/709,716; 61/707,676; and 61/704,869, which are hereby incorporated herein by reference in their entirety. Further, the present disclosure may be used with a rearview packaging assembly such as that described in U.S. Pat. Nos. 8,885,240; 8,814,373; 8,646,924; 8,643,931; and 8,264,761; and U.S. Provisional Patent Application Nos. 61/707,625; and 61/590,259, which are hereby incorporated herein by reference in their entirety. Additionally, it is contemplated that the present disclosure can include a bezel such as that described in U.S. Pat. Nos. 8,827,517; 8,210,695; and 8,201,800, which are hereby incorporated herein by reference in their entirety.

It will be appreciated that embodiments of the disclosure described herein may be comprised of one or more conventional processors and unique stored program instructions that control one or more processors to implement, in conjunction with certain non-processor circuits, some, most, or all of the functions of a roof mounted module, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its form, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A roof mounted module for a vehicle comprising:
a base plate configured to be operably coupled with a vehicle roof;
an outer housing operably coupled with the base plate;
an inner housing proximate the outer housing and including an imager sealing portion defining a sealing plane, the inner housing defining an inner cavity;
an imager module disposed in the cavity and in communication with a viewing aperture defined through the outer housing; and
an imager mounting feature disposed between the imager module and the inner housing, the imager mounting feature applying a force acting in a direction normal to the sealing plane.

2. The roof mounted module of claim 1, wherein the inner housing includes an interior wall that separates the inner cavity into a forward electronics compartment and a rearward imager module compartment.

3. The roof mounted module of claim 1, wherein the viewing aperture defines a viewing window that extends through a rear wall of the imager module.

4. The roof mounted module of claim 3, further comprising:
a clear polymeric cover lens extending over the viewing window and generally flush with the rear wall of the imager module.

5. The roof mounted module of claim 1, wherein the imager module is operably coupled to a lateral circuit board adjacent the base plate.

6. The roof mounted module of claim 1, wherein a space is defined between the inner housing and the outer housing proximate the viewing aperture, wherein the imager mounting feature extends into the space.

7. The roof mounted module of claim 1, further comprising:
a viewing aperture defined in the base plate, wherein a data connection between the vehicle and the imager module extends through the viewing aperture.

8. A roof mounted module for a vehicle comprising:
a base plate including an imager sealing portion;
an outer housing operably coupled with the base plate;
an inner housing proximate the outer housing and including an imager sealing portion defining a sealing plane, the inner housing including an interior wall that defines a forward electronics compartment and a rearward imager module compartment;
an imager module disposed in a cavity and in communication with a viewing aperture defined through the outer housing; and
an imager mounting feature disposed between the imager module and the inner housing, the imager mounting feature applying a force parallel to the sealing plane.

9. The roof mounted module of claim 8, wherein the viewing aperture defines a viewing window that extends through a rear wall of the imager module.

10. The roof mounted module of claim 8, further comprising:
a clear polymeric cover lens extending over a viewing window and generally flush with a rear wall of the imager module.

11. The roof mounted module of claim 8, wherein the imager module is operably coupled to a lateral circuit board adjacent the base plate.

12. The roof mounted module of claim 8, wherein a space is defined between the inner housing and the outer housing proximate the viewing aperture, wherein the imager mounting feature extends into the space.

13. The roof mounted module of claim 8, further comprising:
a viewing aperture defined in the base plate, wherein a data connection between the vehicle and the imager module extends through the viewing aperture.

14. A roof mounted module for a vehicle comprising:
a base plate configured to be operably coupled with a vehicle roof;
a housing assembly operably coupled with the base plate, and including an imager sealing portion defining a sealing plane;
an imager module disposed in the housing assembly and in communication with a viewing aperture defined through the housing assembly; and
an imager mounting feature disposed between the imager module and the housing assembly, the imager mounting feature applying a force acting in a direction normal to the sealing plane.

15. The roof mounted module of claim 14, wherein the housing assembly includes an interior wall that defines a forward electronics compartment and a rearward imager module compartment.

16. The roof mounted module of claim 14, wherein the viewing aperture defines a viewing window that extends through a rear wall of the imager module.

17. The roof mounted module of claim 16, further comprising:
  a clear polymeric cover lens extending over the viewing window and generally flush with the rear wall of the imager module.

18. The roof mounted module of claim 14, wherein the imager module is operably coupled to a lateral circuit board adjacent the base plate.

19. The roof mounted module of claim 16, wherein the viewing window is disposed on a rear wall of the imager module.

20. The roof mounted module of claim 14, further comprising:
  a viewing aperture defined in the base plate, wherein a data connection between the vehicle and the imager module extends through the viewing aperture.

\* \* \* \* \*